United States Patent
Brown

(10) Patent No.: US 10,547,905 B2
(45) Date of Patent: *Jan. 28, 2020

(54) SYSTEMS, METHODS, AND DEVICES FOR MONITORING CONTENT VIEWERSHIP USING SHORT-RANGE WIRELESS COMMUNICATION

(71) Applicant: comScore, Inc., Reston, VA (US)

(72) Inventor: Michael A. Brown, Broadlands, VA (US)

(73) Assignee: Comscore, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/108,819

(22) Filed: Aug. 22, 2018

(65) Prior Publication Data
US 2018/0367849 A1 Dec. 20, 2018

Related U.S. Application Data

(63) Continuation of application No. 15/130,119, filed on Apr. 15, 2016, now Pat. No. 10,070,179.

(51) Int. Cl.
*H04N 21/442* (2011.01)
*H04N 21/81* (2011.01)
(Continued)

(52) U.S. Cl.
CPC ... *H04N 21/44222* (2013.01); *H04N 21/2408* (2013.01); *H04N 21/252* (2013.01); *H04N 21/25866* (2013.01); *H04N 21/4223* (2013.01); *H04N 21/42684* (2013.01); *H04N 21/43637* (2013.01); *H04N 21/44218* (2013.01);
(Continued)

(58) Field of Classification Search
None
See application file for complete search history.

(56) References Cited

U.S. PATENT DOCUMENTS

| 7,376,722 B1 | 5/2008 | Sim et al. |
| 8,626,901 B2 | 1/2014 | Pugh et al. |

(Continued)

OTHER PUBLICATIONS

Joseph Nasr Ramzi et al., "Assigning Demographic Data to Identifiers", U.S. Appl. No. 14/173,414, filed Feb. 5, 2014, pp. 1-32.

*Primary Examiner* — Omar S Parra
(74) *Attorney, Agent, or Firm* — Baker & Hostetler LLP

(57) ABSTRACT

Systems, methods, and computer-readable medium are provided for identifying content displayed by a media device and associating the content with demographics of one or more users. An indication to capture an image of the content displayed by the media device is initially received. The image of the content is then captured and stored. One or more image fingerprints in the image of the content are identified. The monitoring device transmits the one or more image fingerprints, a timestamp of the time at which the image was captured, and an identifier of the monitoring device to a server. The server compares the one or more image fingerprints to fingerprints in a database to identify the content displayed by the media device. The identity of the content is then associated with demographic information of the one or more users. A report of the content viewership of the content displayed by the media device is then generated.

20 Claims, 8 Drawing Sheets

(51) Int. Cl.

| | |
|---|---|
| *H04N 21/466* | (2011.01) |
| *H04N 21/24* | (2011.01) |
| *H04N 21/25* | (2011.01) |
| *H04N 21/45* | (2011.01) |
| *H04N 21/258* | (2011.01) |
| *H04N 21/4223* | (2011.01) |
| *H04N 21/426* | (2011.01) |
| *H04N 21/4363* | (2011.01) |
| *H04N 21/658* | (2011.01) |
| *H04N 21/8358* | (2011.01) |

(52) U.S. Cl.
CPC ..... *H04N 21/4516* (2013.01); *H04N 21/4667* (2013.01); *H04N 21/6582* (2013.01); *H04N 21/812* (2013.01); *H04N 21/8358* (2013.01)

(56) References Cited

U.S. PATENT DOCUMENTS

| | | | |
|---|---|---|---|
| 2010/0095317 A1 | 4/2010 | Toebes et al. | |
| 2010/0153983 A1 | 6/2010 | Philmon et al. | |
| 2012/0219156 A1 | 8/2012 | Ramaswamy et al. | |
| 2014/0101685 A1* | 4/2014 | Kitts | H04N 21/44213 725/14 |
| 2014/0270195 A1* | 9/2014 | Nielsen | H04R 29/00 381/56 |
| 2016/0057490 A1* | 2/2016 | Besehanic | H04N 21/44213 725/19 |
| 2016/0066005 A1* | 3/2016 | Davis | H04N 21/25808 725/19 |

\* cited by examiner

SYSTEMS, METHODS, AND DEVICES FOR MONITORING CONTENT VIEWERSHIP USING SHORT-RANGE WIRELESS COMMUNICATION

CROSS REFERENCE TO RELATED APPLICATIONS

This application is a continuation of U.S. patent application Ser. No. 15/130,119, filed Apr. 15, 2016, the disclosure of which is hereby incorporated by reference herein.

TECHNICAL FIELD

The present application relates to identifying content displayed by a media device and associating the content with demographics of one or more users associated with the media device.

BACKGROUND

Monitoring viewership of broadcast media content, such as television programming, has been a difficult and imperfect process. Traditionally, target audiences would have to self-record and report their own viewing or listening habits to audience measurement systems.

Improvements in technology have led to the use of specialized monitoring devices that can be connected to home televisions to record and report the station or program that a television is tuned to, which approximates the viewing habits of participating viewers. However, a household may have multiple viewers that use the same television, and the specialized monitoring devices are incapable of determining which viewers (if any) are actually watching the television and/or at what times or during what period viewers are in the room. While conventional monitoring devices can perhaps determine when a television is tuned to a specific program and for how long, such devices cannot determine which of all the possible viewers is, or could be, in fact viewing the program and cannot determine the time period for which each possible viewer viewed, or could have viewed, the program.

For example, a household may have several viewers that cover multiple demographics, such as adult men, adult women, teenagers, and young children. Determining which of the viewers are actually watching the tuned-to content and matching specific viewers and viewing periods to specific content can greatly improve content viewership measurements.

Therefore, there is a desire for systems, devices, and methods for providing improved monitoring of content viewership.

SUMMARY

Systems, apparatus, computer-readable media, and methods are disclosed for monitoring content viewership using short-range wireless communication by transmitting a short-range wireless signal, detecting a user device that responds to the transmitting, detecting content being presented by a media device, storing monitoring data that include an indication of the user device and an indication of the content being presented, and transmitting the monitoring data to a server.

Systems, apparatus, computer-readable media, and methods are also disclosed for monitoring content viewership using short-range wireless communication by receiving monitoring data from multiple monitoring devices, where the monitoring data includes indications of user devices that were detected by the monitoring devices using a short-range wireless signal and indications of content presented by media devices that was detected by the monitoring devices, determining users associated with the user devices that were detected, identifying content based on the indications of the content detected by the monitoring devices, matching the users to the content using the monitoring data, and generating a report of content viewership based on the matching.

It will be appreciated that this summary is intended merely to introduce a subset of aspects of the disclosure, presented below. Accordingly, this summary is not to be considered limiting on the disclosure.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
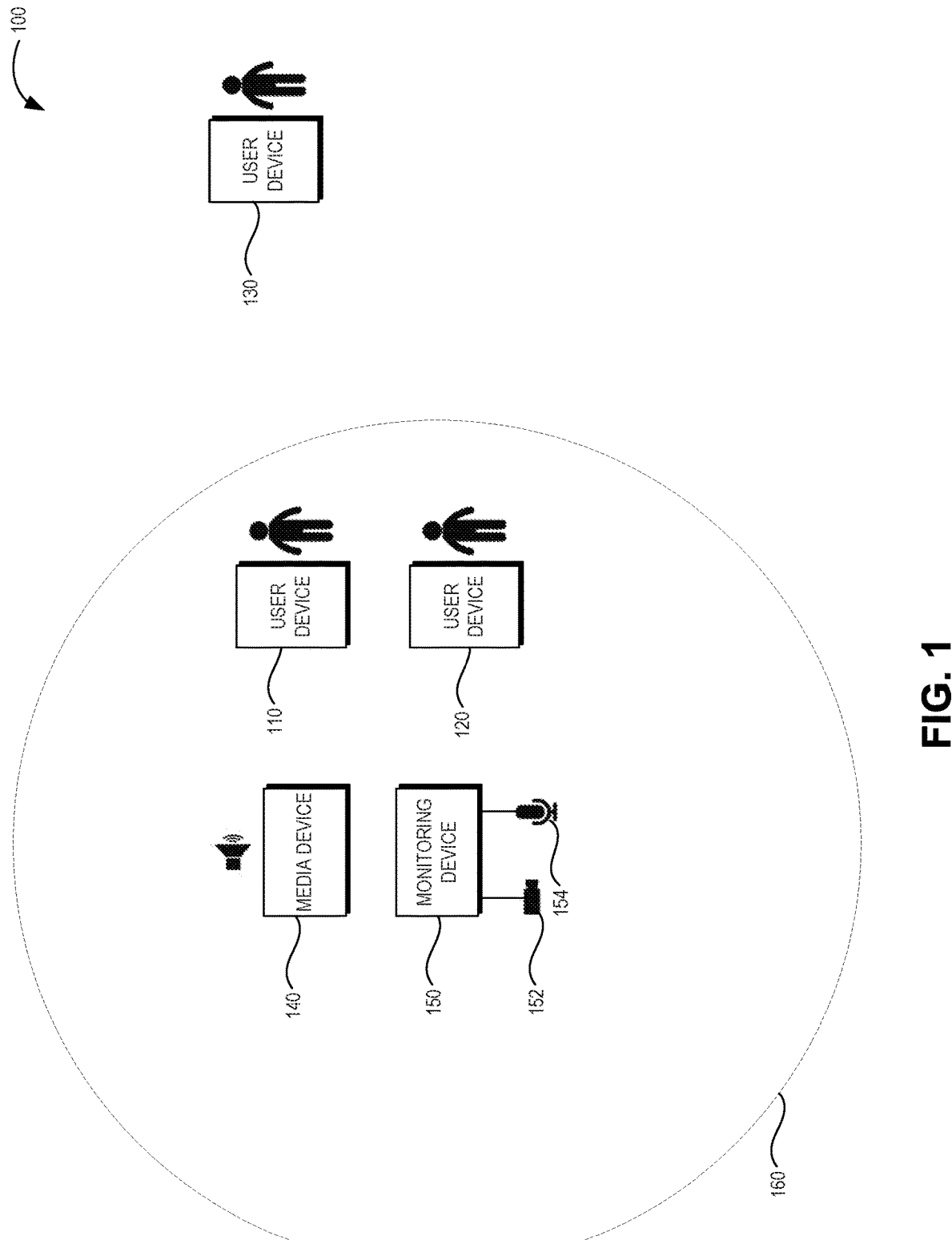
FIG. 1 is a diagram depicting an example of a content and user monitoring environment, consistent with certain disclosed embodiments.

The following detailed description refers to the accompanying drawings. Wherever convenient, the same reference numbers are used in the drawings and the following description refers to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Content viewership monitoring technologies generally are unable to match specific viewers and viewing periods to specific content, particularly in multi-viewer households. Additionally, targeted advertising technologies are generally limited to delivering advertisements based on overall geographic or household demographics and/or the demographics of all users of a media device, and may be unable to target specific viewers.

As described below, various technologies, including content viewership monitoring technologies and targeted advertising technologies, can be improved by providing real-time content viewership measurements that matches specific viewers and viewing periods to specific content. Content viewership measurements can be captured in real-time by monitoring user devices, such as smartphones, which are generally operated by a single viewer. Many user devices include hardware that allows for short-range wireless communication, such as a radio frequency transmitter. Accordingly, short-range wireless communication can be leveraged to monitor locations of user devices and, thus, the operators of the user devices. For example, short-range wireless communication can be used to detect when a user device is in the same room as a monitoring device.

The user device location information can be combined with monitored content information (e.g., collected using a microphone, a video camera, a connection, etc. as described below), and specific viewers and viewing periods can be matched to specific content in real time. The real-time content viewership can be used to generate reports (e.g., in real time), adjust advertising rates (e.g., in real time), and/or select advertisements targeted for specific viewers (e.g., in real time).

FIG. 1 is a diagram depicting an example of a content and user monitoring environment, consistent with certain disclosed embodiments. In particular, FIG. 1 depicts a content and user monitoring environment 100 that includes a user device 110, a user device 120, a user device 130, a media device 140, and a monitoring device 150.

In some embodiments, user device 110, user device 120, and user device 130 can each represent any type of one or more portable computing devices that can exchange data over short distances using wireless technology. For example, user device 110, user device 120, and/or user device 130 can transmit and receive signals that correspond to the Bluetooth® wireless technology standard (i.e., using short-wavelength ultra-high frequency (UHF) radio waves in the industrial, scientific, and medical (ISM) band from 2.4 to 2.485 gigahertz (GHz)). Hereinafter, a signal that corresponds to the Bluetooth® wireless technology standard can be referred to as a Bluetooth® signal. In another example, user devices 110-130 may transmit and receive signals using a line-of-sight wireless technology, such as infrared signaling.

In various embodiments, user device 110, user device 120, and/or user device 130 can be, for example, a smartphone, a tablet computer, a portable media player, a laptop, a laptop/tablet computer hybrid, a smartwatch, an activity tracker, a Bluetooth tracker, etc. For example, each participating member of a participating household can be provided with a Bluetooth tracker (e.g., a Tile™ Bluetooth tracker) that they carry around with them while in their house, including when they watch television, listen to the radio, etc. The Bluetooth tracker can be capable of receiving inquiry requests and transmitting responses that include an address of the Bluetooth tracker, a name of the Bluetooth tracker, and/or a user identifier associated with a particular one of the users. Inquiry requests and responses are discussed in further detail below.

In some implementations, user device 110, user device 120, and/or user device 130 can be a device capable of running a content viewership monitoring application, such as a smartphone, a tablet computer, a laptop, a laptop/tablet computer hybrid, etc. In such implementations, users that have elected to participate in content viewership monitoring can install the content viewership monitoring application on his or her user device 110-130. The application can allow the user, in some embodiments, to register for content viewership monitoring by entering his or her name and demographic information. The user's name and demographic information and an identifier of the user device running the application (e.g., an address of the user device) can be included in a roster of participating users, discussed in further detail below.

In other implementations, participating users can register for content viewership monitoring using other methods, such as, for example, registering and providing their name, demographic information, and user device identifier via a website or via a mail-in form.

In some embodiments, the application can allow the user to indicate when they are consuming content, such as watching television or listening to the radio, (hereinafter referred to as "viewing" content, which includes listening to audio-only content). Accordingly, one or more user devices can be matched to the user using a clustering analysis, discussed in further detail below. For example, the user can indicate when they are viewing content via a smartphone and the system (e.g., the application) may match or associate the user to the smartphone, and the system may also match or associate the user to a smartwatch that is often or typically within signal range of monitoring device 150 when the user is viewing content.

In various embodiments, the application can determine which user is associated with a user device using a voice recognition algorithm. For example, the application can capture a sample of the user's voice using a microphone of the user device and transmit the recorded audio and/or voice biometrics to a central server (not shown in FIG. 1). The central server can store voice biometrics associated with participating users for matching user devices to participating users, determine voice biometrics associated with an audio file, and/or determine participating users using the voice biometrics.

In some embodiments, media device 140 can represent any type of one or more devices that can present content (e.g., audio content, audiovisual content, etc.) such as a television, a radio, a video game console, or the like. In further embodiments, the content can be media content, such as television or radio programming or the like. As used herein, the "content" presented by a media device can include, but is not limited to, songs, radio shows, television shows, movies, sporting events, audio commercials or advertisements, video commercials or advertisements, still-picture advertisements, etc., regardless of the conveying means, which may include RF broadcasted content, cable content, satellite content, pay-per-view content, on-demand content, etc.

In some embodiments, monitoring device 150 can represent any type of one or more devices that can exchange data over short distances using wireless technology and store monitoring information. For example, monitoring device 150 can be a Bluetooth scanner and/or beacon that is able to receive and transmit Bluetooth signals. In another example, monitoring device 150 may be a computerized device capable of infrared signaling. In various embodiments, monitoring device 150 can exchange data with one or more user devices (e.g., user device 110 and user device 120) that are within range.

In some implementations, monitoring device 150 can exchange data by transmitting a low power signal (e.g., a one-half to one milliwatt (mW) radio frequency (RF) signal) to identify any user devices within the range of the low power signal (e.g., five to ten meters, or within the same room). In various embodiments, the data exchanged between monitoring device 150 and any user devices can include a user device identifier and/or a user identifier. In some embodiments, the user device identifier can be a unique address associated with a user device. For example, Bluetooth® RF devices are associated with a unique 48-bit address presented in the form of a 12-digit hexadecimal value, and the unique 48-bit address can be the user device identifier. In other embodiments, the user identifier can be a name, username, and/or any other type of unique identifier associated with a user of the user device.

Signal range 160, can represent a distance or a range in which monitoring device 150 is capable of reliably exchanging data with user devices. As shown in FIG. 1, user device 110 and user device 120 are within signal range 160. Accordingly, monitoring device 150 is capable of exchanging data with user device 110 and user device 120 for the purpose of monitoring the user devices. As also shown in FIG. 1, user device 130 is outside of signal range 160. Accordingly, user device 130 may not be able to receive a signal from monitoring device 150 (and/or vice versa) that is of sufficient strength to reliably exchange data. For implementations employing a line-of-sight signaling technology, the signal range 160 may conform to the shape of the room containing the monitoring device 150.

In some embodiments, monitoring device 150 can determine which devices are within signal range 160. For example, monitoring device 150 can transmit an inquiry request using the low power signal. If user device 110 and/or user device 120 are listening for inquiry requests, they can receive the transmitted request, and respond by transmitting an address of the user device, a name of the user device, and/or a user identifier. In some embodiments, the transfer of requests and responses can occur without a formal connection being established between monitoring device 150 and user device 110 and/or user device 120. In other embodiments, monitoring device 150 can connect to the user devices, and the user devices can transmit information, such as a name of the user device and/or a user identifier, while connected to monitoring device 150. In various embodiments, monitoring device 150 can transmit inquiry requests at regular intervals (e.g., every fifteen seconds) to determine which user devices are currently within signal range 160.

As shown in the example of FIG. 1, because user device 130 is outside of signal range 160, user device 130 may not receive the inquiry request and, accordingly, may not respond with its address, name, and/or a user identifier.

In some implementations, monitoring device 150 and user device 110, user device 120, and/or user device 130 can use the leader/follower model of communication, where monitoring device 150 (i.e., the leader device) has unidirectional control over user device 110, user device 120, and/or user device 130 (i.e., the follower devices). Accordingly, monitoring device 150 can be connected to multiple leader devices, but each user device can only be connected to a single follower device and are not connected directly to each other.

A network that uses Bluetooth® signals and the leader/follower model of communication is generally referred to as a "piconet." The piconet can include only one leader device and one or more follower devices. Generally, in Bluetooth® protocols, the leader device can interconnect with up to seven active follower devices. However, the leader device can manage additional inactive follower devices and bring them into active status at any time.

In some embodiments, monitoring device 150 can additionally include a microphone 154 and/or a video camera 152 to capture audio and/or visual output from media device 140. In some implementations, monitoring device 150 can store audio and/or audiovisual files by recording output from media device 140. In further implementations, monitoring device 150 can detect or identify acoustic, video, and/or image fingerprints and/or digital watermarks in the stored audio and/or audiovisual files. In various embodiments, monitoring device can capture audio and/or audiovisual output at regular intervals (e.g., every thirty seconds).

For example, monitoring device 150 can employ automatic content recognition (ACR) to identify acoustic and/or video fingerprints in a recorded audio or audiovisual file. An acoustic fingerprint is a condensed digital summary, deterministically generated from an audio signal, that can be used to identify an audio sample or quickly locate similar items in an audio database. In some embodiments, monitoring device 150 can have the audio database stored thereon, and can update the audio database via communication with a central server. The audio database can be used to associate acoustic fingerprints with content. In other embodiments, monitoring device 150 can send the acoustic fingerprint to a central server for identification of the content. In further embodiments, monitoring device 150 can simply store the acoustic fingerprint for later analysis and identification or determination of the content by a central server, as discussed below.

As an additional example, monitoring device 150 can use ACR to identify digital watermarks in an audio or audiovisual file. A digital watermark is a marker covertly embedded in a noise-tolerant signal such as a signal from the media device 140 as recorded in an audio, audiovisual, or image file. A digital watermark may be invisible to a person watching or listening to the content, but can be captured and identified or recognized by monitoring device 150 by applying a digital watermark detecting and retrieval algorithm to an audio or audiovisual file. A digital watermark must be embedded using an digital-watermark-embedding algorithm on an audio or audiovisual file prior the content being broadcast (e.g., by the content creators, by a television station airing the content, by a radio station airing the content, etc.). The digital watermark can be associated with the content and the association can be stored in a digital watermark database. In some embodiments, monitoring device 150 can have the digital watermark database stored thereon, and can update the digital watermark database to keep it current by communication with a central server. In other embodiments, monitoring device 150 can send the identified digital watermark to a central server for identification of the content. In further embodiments, monitoring device 150 can simply store the digital watermark for later analysis and identification or determination of the content by a central server, as discussed below.

In still further implementations, monitoring device 150 can determine content being presented by media device 140 by communicating with media device 140. For example, monitoring device 150 can be connected to media device 140 (e.g., via a direct network connection, via a local area network connection, via a jumper cable, and/or via a wireless signal or the like) and receive indications of the channel and/or station that media device 140 is tuned to. As another example, monitoring device 150 can be incorporated into and a part of media device 140 (i.e., monitoring device 150 and media device 140 can be one device), and can receive indications of and/or be configured to monitor the channel and/or station to which media device 140 is tuned.

In various embodiments, monitoring device 150 can link, connect, or otherwise associate content with user device identifiers (e.g., an address), user device names, and/or user identifiers. For example, in the event that a user device is within signal range 160 at the same time as content is being presented, the user device and/or user can be associated with the content, for example by creating and/or storing information or a record of this event. In some embodiments, monitoring device 150 can associate the content, the user device identifiers, the user device names, and/or the user identifiers with timestamps, and send information corresponding to the content, the user device identifiers, the user device names, and/or the user identifiers along with the timestamps to a central server, as described in further detail below.

The diagram depicted in FIG. 1 is merely for the purpose of illustration and is not intended to be limiting. Further, the content and user monitoring environment depicted is merely a simplified example of a content and user monitoring environment, consistent with certain disclosed embodiments, but this example is not intended to be limiting and many variations are possible. For example, in various embodiments, the content and user monitoring environment can include additional user devices, media devices, monitoring devices, and/or other devices.

Figure 2:
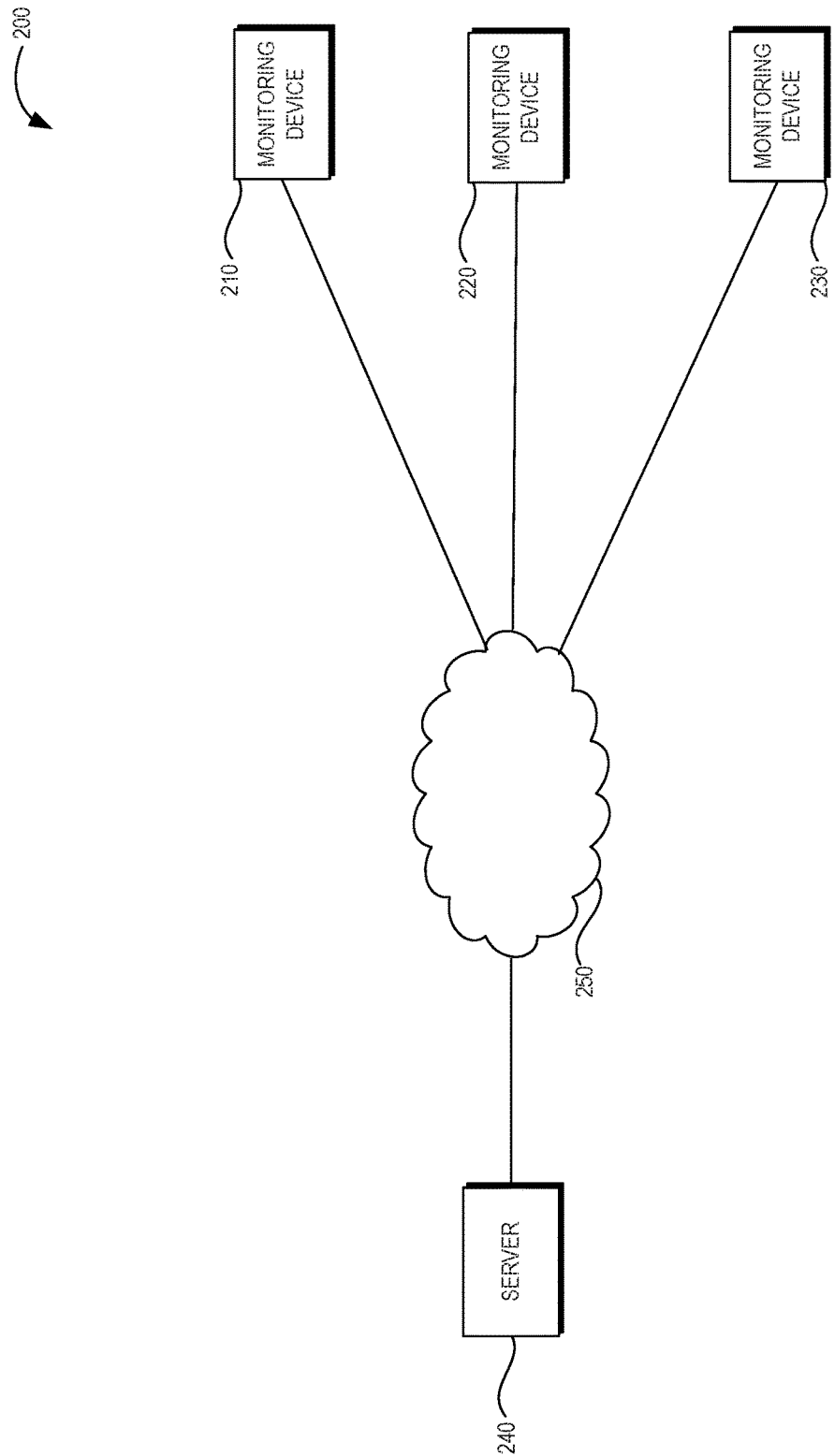
FIG. 2 is a diagram depicting an example of a content and user monitoring system, consistent with certain disclosed embodiments.

FIG. 2 is a diagram depicting an example of a content and user monitoring system, consistent with certain disclosed embodiments. In particular, FIG. 2 depicts a content and user monitoring system 200 that includes a monitoring device 210, a monitoring device 220, a monitoring device 230, a server 240, and a network 250.

In some embodiments, monitoring device 210, monitoring device 220, and/or monitoring device 230 can each represent any type of one or more devices that can exchange data over short distances using wireless technology, store monitoring data, and send monitoring data to server 240 via network 250. For example, monitoring device 210, monitoring device 220, or monitoring device 230 can represent monitoring device 150 in FIG. 1.

In some implementations, server 240 can represent any type of one or more computing devices that can, for example, communicate with other devices via network 250, analyze monitoring data from one or more monitoring devices, and generate monitoring reports. In various embodiments, server 240 can represent one or more computing devices such as, for example, a server, a mainframe computer, a laptop computer, and/or a desktop computer. In some embodiments, server 240 can generate real-time content viewership that can be used to generate reports (e.g., in real time), adjust advertising rates (e.g., in real time), and/or select advertisements targeted for specific viewers (e.g., in real time).

In some embodiments, the monitoring data can include audio or audiovisual files recorded by monitoring device 210, monitoring device 220, or monitoring device 230. In further implementations, the monitoring data can include acoustic fingerprints or digital watermarks generated by and received from monitoring device 210, monitoring device 220, or monitoring device 230 or acoustic fingerprints or digital watermarks generated by server 240 based on the stored audio or audiovisual files. In still further implementations, server 240 can identify content associated with the audio or audiovisual files or acoustic fingerprints or digital watermarks by analyzing the acoustic fingerprints or digital watermarks, while, in additional implementations, the monitoring data received from monitoring device 210, monitoring device 220, and/or monitoring device 230 can include content identifiers. In various embodiments, server 240 can store the content identifiers.

In some implementations, the monitoring data can include indications of user devices and/or indications of users associated with the content. In some embodiments, where the monitoring data includes indications of user devices, server 240 can compare the indications of user devices (e.g., addresses, user device names, etc.) to a stored roster of participating users that associates user devices with participating users. Accordingly, server 240 can match users to user devices, and determine the users associated with the content.

In other implementations, the monitoring data can include indications of user devices and/or indications of users associated with timestamps. The monitoring data can also include content information associated with timestamps. In such embodiments, server 240 can match users to content using the timestamps. In other words, server 240 can determine that a user was watching certain content if the timestamp associated with the user's device matches a timestamp associated with the content.

In some embodiments, the monitoring data can additionally include a unique identifier of the monitoring device that generated the monitoring data, such as, for example, an alphanumeric string that is unique to each monitoring device, so that server 240 can determine which monitoring device is associated with the monitoring data.

In further embodiments, server 240 can verify the content information by comparing the timestamp in the content information to a programming schedule. Additionally, if the content information only includes an indication of a channel that a media device was tuned to, server 240 can identify the content based on the timestamp and the schedule.

In some embodiments, network 250 can represent any type of one or more wide area communications networks. For example, network 250 can include the Internet and/or one or more mobile networks.

In some embodiments, server 240 can additionally transmit information to monitoring devices 210-230, such as, for example, a roster of participating users and updates thereof, an audio database and updates thereof, a digital watermark database and updates thereof, etc.

The diagram depicted in FIG. 2 is merely for the purpose of illustration and is not intended to be limiting. Further, the content and user monitoring system depicted is merely a simplified example of a content and user monitoring system, consistent with certain disclosed embodiments, but this example is not intended to be limiting and many variations are possible. For example, in various embodiments, the content and user monitoring system can include additional monitoring devices, servers, and/or other devices.

Figure 3:
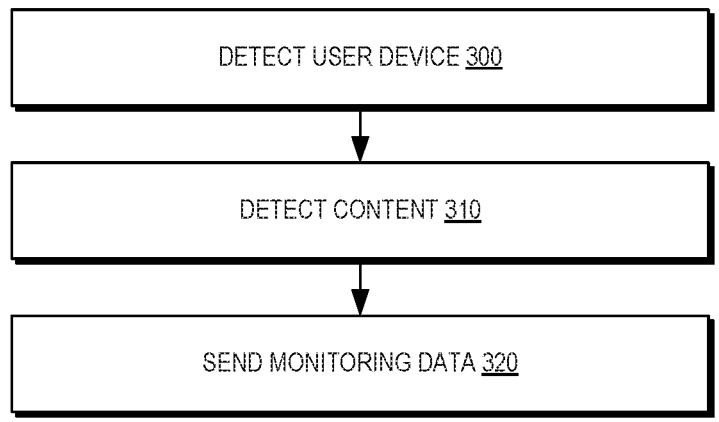
FIG. 3 is a flow diagram illustrating an example of a process of monitoring user devices and content, consistent with certain disclosed embodiments.

FIG. 3 is a flow diagram illustrating an example of a process of monitoring user devices and content, consistent with certain disclosed embodiments. In various embodiments, the process can be performed using a computerized monitoring device or devices. For example, the process can be performed by monitoring device 150 in FIG. 1 or monitoring device 210, monitoring device 220, or monitoring device 230 in FIG. 2.

The example of a process shown can begin in 300, when the monitoring device detects one or more user devices. For example, the monitoring device can transmit an inquiry request using a low power (e.g., weak) signal (e.g., a one mW signal) to identify any user devices within a range of the low power signal (e.g., within five meters or ten meters of the monitoring device or within the same room for line-of-sight signals). The inquiry request can be received by one or more user devices within a signal range of the computing device (e.g., signal range 160 in FIG. 1). The one or more user devices can respond to the inquiry request with a user device address, a user device name, and/or a user identifier. In some implementations, the monitoring device can connect to the user devices, and the user devices can transmit information, such as a user device name and/or a user identifier, while connected to the monitoring device.

In some embodiments, the monitoring device can generate a timestamp indicating or representing the time at which a user device was detected, and associate the timestamp with the user device information (e.g., the user device address, the user device name, and/or the user identifier).

In various embodiments, 300 can be performed repeatedly and/or periodically. For example, the monitoring device can transmit inquiry requests every second, every 30 seconds, every minute, every five minutes, etc.

Additionally, in some implementations, in 300, the monitoring device can determine which user devices are no longer within the signal range. For example, if the monitoring device transmits a first inquiry request at a first time and receives a response from a user device and then subsequently sends a second inquiry request at a second time and does not receive a response from the user device, then the monitoring device can record the lack of response and/or indicate or determine that the user device has left its signal range. Accordingly, in some embodiments, the monitoring device can create or record data for each user device that includes both a timestamp associated with the first time the user device is identified and a timestamp associated with the first subsequent time when the user device does not respond to an inquiry request. Therefore, analysis of the data, including these timestamps, is able to deduce, conclude, or otherwise determine when particular users are viewing content from a media device near or associated with the monitoring device and when users stop or are no longer viewing the content because they have left the vicinity of the media device (i.e., are no longer viewing).

In further embodiments, the monitoring device can record multiple timestamps corresponding to a user device entering and leaving the signal range. For example, the user of the device can leave and reenter the room containing the media device numerous times within an hour or during a TV show, or during an advertisement, to take breaks, get a snack, skip commercials, etc.

In some embodiments, the monitoring device can also record a signal strength associated with a user device. For example, if a user device is close to the monitoring device, the strength of a monitoring-device-received signal transmitted by the user device during the user device's response(s) can be relatively strong, and an indication of that strength can be recorded (e.g., 0.5-0.999 milliwatt received signal strength for a 1 milliwatt user device transmitter). As an additional example, if a user device is at the edge of the signal range of the monitoring device, the strength of a received signal transmitted during the user device's response can be relatively weak, and an indication of that strength can be recorded (e.g., 0.001-0.2 milliwatt received signal strength).

As used herein, the data detected, generated, recorded, determined, etc. in 300 can be referred to as "user device data." In 300, the monitoring device can store the user device data, and each record or entry in the user device data can correspond to a detected user device.

In 310, the monitoring device can detect, via, for example, a microphone, a camera, and/or a connection with a media device, content being displayed, audibly played, or otherwise presented by the media device. For example, the monitoring device 150 can detect content being presented by the media device 140 in FIG. 1.

In some embodiments, the content that is detected can be recorded as audio or audiovisual files. In other embodiments, the detected content information can be acoustic fingerprints and/or digital watermarks associated with the content, which the monitoring device may record, store, and/or process. In further embodiments, the detected content information can be an indication of a channel or station to which the media device is tuned and a timestamp.

In some implementations, 310 can be performed repeatedly and/or periodically. For example, the monitoring device can detect content every second, every 30 seconds, every minute, every five minutes, etc.

Additionally, in some implementations, the monitoring device may be designed such that it detects content only if at least one user device is identified in 300. Accordingly, if no user devices are detected within a signal range of the monitoring device (i.e., if no users are detectably watching or listening to the content) then 310 may not be performed and the monitoring device can loop up (not shown) in the process of FIG. 3 to iteratively perform 300 again and then proceed to 310 when at least one device is detected.

In some embodiments, the monitoring device may perform 300 only if content is detected in 310 and/or may store user device data only if content is detected in 310 (not shown in FIG. 3). For example, if a media device is not presenting identifiably content (e.g., media devices in the area of the monitoring device are turned off, are muted, and/or are presenting unrecognizable content), then no content may be detected (e.g., 310 is not performed by the monitoring device). In further embodiments, the monitoring device may detect that the media device is off, is muted, or is presenting unrecognizable content and may still perform 300. In such embodiments, the information stored about the content can indicate that there was no content, the content was muted, or that the content was unrecognizable.

In some embodiments, the monitoring device can detect, record, or determine a volume level of content being presented. For example, the monitoring device can determine a decibel level of the volume and/or classify the volume as high or low or the like based on the decibel level. In further embodiments, the monitoring device can additionally detect, record, or determine if audiovisual content is muted. For example, if a camera of the monitoring device determines that visual content is being presented by a media device, but a microphone of the monitoring device cannot detect an audio signal, the monitoring device can record or store information indicating that the audiovisual content is muted and/or has a very low or undetectable volume level, or the like.

As used herein, the data detected, generated, recorded, determined, etc. in 310 can be referred to as "content data." In 310, the monitoring device can store the content data, and each record or entry in the content data can correspond to a detected content item (e.g., an audio file, an audiovisual file, an acoustic fingerprint, a digital watermark, a volume level, etc.).

In 320, the monitoring device can transmit monitoring data to a central server (e.g., server 240 in FIG. 2). In various embodiments, the monitoring data can include the user device data from 300 and the content data from 310. In further embodiments, the monitoring data can additionally include a unique identifier of the monitoring device.

While the functions or operations depicted in FIG. 3 are shown as being performed in a particular order, the order described is merely an example, and various different sequences of operations can be performed, consistent with certain disclosed embodiments. For example, as described above, 300 can be performed repeatedly until a user device is identified and then the process can proceed to 310 and then 320. Additionally, as an example, 310 can be performed repeatedly until recognizable content is identified and then the process can proceed to 300 and then 320. Further, as an example, 300 and 310 can be performed repeatedly, user device and content data can be repeatedly stored, and then the monitoring device can send the data to the central server in batches, for example, at predetermined intervals (e.g., once per day, once per hour, once per 30 minutes, once per newly identified content, etc.).

Moreover, the operations are described in FIG. 3 as discrete steps merely for the purpose of explanation, and, in some embodiments, multiple operations may be performed simultaneously and/or as part of a single computation. The operations described are not intended to be exhaustive, limiting, or absolute, and various operations can be inserted or removed.

Figure 4:
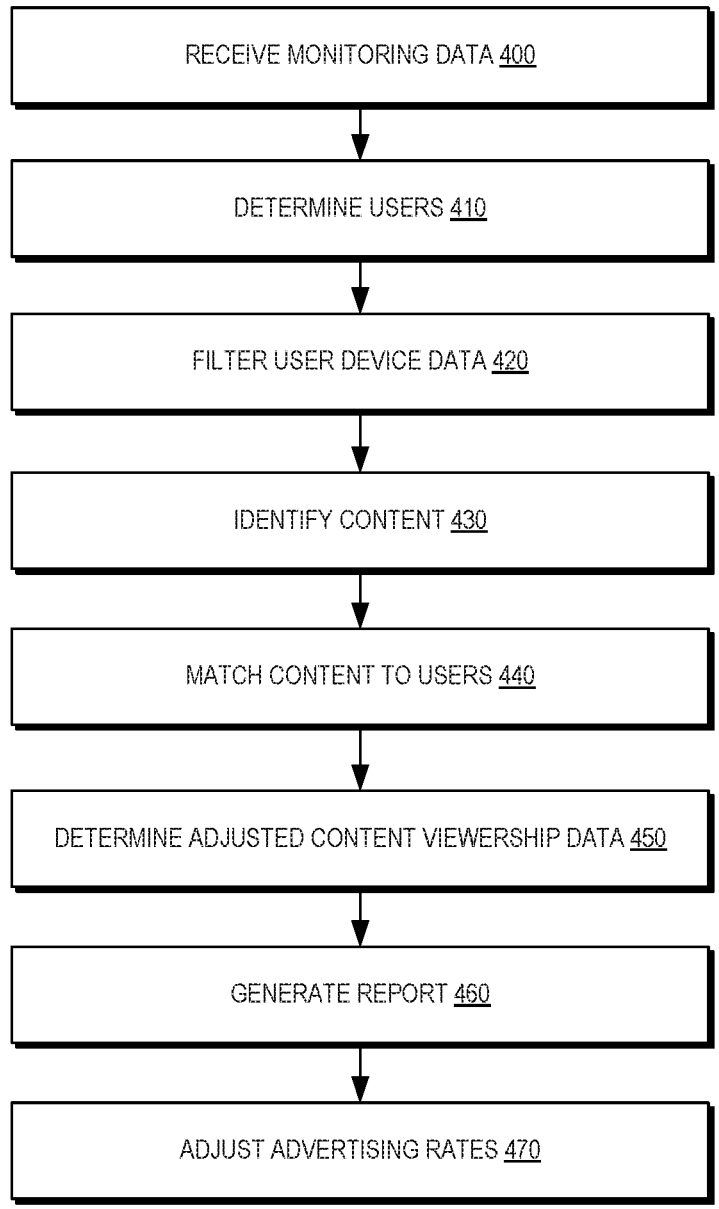
FIG. 4 is a flow diagram illustrating an example of a process of analyzing monitoring data, consistent with certain disclosed embodiments.

FIG. 4 is a flow diagram illustrating an example of a process of analyzing monitoring data, consistent with certain disclosed embodiments. In various embodiments, the process can be performed using a computing device (or multiple computing devices). For example, the process can be performed by server 240 in FIG. 2 after receiving monitoring data transmitted or sent from one or more monitoring devices (e.g., 320 in FIG. 3). For another example, in some implementations, some or all of the operations of FIG. 4 may be performed by the computerized monitoring device that collected, recorded, created, or otherwise generated the monitoring data.

The example process can begin in 400 when the computing device receives the monitoring data from one or more monitoring devices. In various embodiments, the monitoring data can include user device data and content data. In further embodiments, the monitoring data can include a unique identifier of the monitoring device that generated the monitoring data.

In some embodiments, if the monitoring data does not include a unique identifier of the monitoring device, the monitoring device can be identified based on, for example, an Internet Protocol (IP) source address of a network data packet that includes the monitoring data (e.g., the IP address of the transmitting monitoring device).

In 410, the computing device can identify or determine users based on the user device data. In some implementations, the computing device can have access to a panel or roster of participating users (e.g., the roster is stored on the computing device). In some embodiments, the roster of participating users can be a table, database, or other data structure that includes, for each participating user that has elected to participate in content viewership monitoring, a unique identifier of a user (e.g., an ID number, or unique username), demographic information on a user (e.g., date of birth, gender, nationality, race, residence address, occupation, level of education, income, etc.), and, optionally, the users' names, types of user devices, names of the user devices, addresses of the user devices, monitoring device identifiers, voice biometrics, etc. In various embodiments, the roster of participating users can be populated using information received from the participating users during registration, described above.

In some implementations, the computing device can compare each record in the user device data with the roster of participating users to identify or determine the participating user associated with the user device data. For example, if the user device data includes a user device address, the computing device can search for the user device address in the roster of participating users and identify which user is associated with that user device address. Similarly, the user can be identified if the user device data includes a username, a name of a user device, etc.

Additionally, in some embodiments, the computing device can identify or determine users based on data received from applications running on user devices. For example, an application, running on a user device, can receive an indication from a user that identifies the user and indicates that he or she is viewing and/or listening to a media device (e.g., watching television) and generate a timestamp. The application on the user device can then send the indication, the timestamp, and an identifier of the user device either directly to the computing device (e.g. via a wireless Internet connection) or to a monitoring device that passes it to the computing device (e.g., to a server 240). The computing device may compare the information received from the user device to the user device data received from a monitoring device to identify or determine user devices that were within a signal range of the monitoring device when the user indicated he or she was viewing or listening to a media device based on the timestamps. Accordingly, the computing device can not only match the user to the user device used to record the indication, but can also match the user to other user devices within the signal range of the monitoring devices. In other words, the computing device can deduce or conclude which user device(s) are carried by, used by, or otherwise associated with a particular user by correlating the devices that are in range at a given time with the user that reports viewing/listening to the media device at the same or a similar time. For example, the computing device can use user device data and indications from a user that span multiple days, weeks, months, etc. and identify each device that is within a signal range of the monitoring device when the user indicates he or she is watching television. The computing device can then apply a clustering analysis to determine which user devices are usually within the signal range when the user indicates he or she is watching television. The user devices that are usually within the signal range can also be deduced as being associated with the user.

In 420, the computing device can filter user device data based on a user not being identified, timestamps, signal strength, etc. In various embodiments, user device data that is "filtered" can be, for example, deleted or otherwise removed from consideration or further processing, or associated with an indicator that it was filtered and is to be analyzed separately from user device data that is not filtered and/or used for clustering analyses, as described above.

In some embodiments, the user device data can include timestamps corresponding to when the consumer started watching or listening to content (i.e., when the user's device came within range of a monitoring device) and when the consumer stopped watching or listening to content (i.e., when the user's device went outside the range of a monitoring device). The user device data can include multiple sets of timestamps, indicating that the consumer left and reentered the signal range of the monitoring device numerous times.

In some implementations, the computing device can filter the user device data by determining that a user device was not within a signal range of the monitoring device for at least a threshold amount of time (e.g., five minutes). For example, if the user device data included multiple sets of timestamps, the computing device can determine a total time that a user device was within a signal range of a monitoring device, and determine whether to filter the user device data based on the total time.

In other implementations, the computing device can filter the user device data when the computing device is unable to identify a user based on the user device data. For example, the user device identified may be associated with a user that has not elected to participate in the content viewership monitoring, such as, for example, a user device of a non-participating visitor to the home of a family participating in the content viewership monitoring. Accordingly, because the user has not elected to participate, the user will not have an entry in the roster of participating users, and the user will not be identified.

In other implementations, the computing device can filter the user device data when the computing device determines that the signal strength of the user device detected by a monitoring device was below a specific threshold. For example, if a user device is close to the monitoring device, the recorded signal strength received during the user device's response can be relatively strong or high powered. Accordingly, the computing device can compare the signal strength to a specific threshold (e.g. 0.2 milliwatt for a 1 milliwatt transmission) to determine that the recorded strength of the signal is above the threshold and not filter the user device data based on the signal strength. As an additional example, if a user device is at the edge of the signal range of the monitoring device, the recorded signal strength during the user device's response can be relatively weak or low powered. Accordingly, the computing device can determine that the recorded strength of the signal is below the threshold (e.g., below 0.2 milliwatt) and filter out the user device data.

In 430, the computing device can identify content based on the content data. In some embodiments, the content data received in 400 can include one or more of recorded audio or audiovisual files, acoustic fingerprints, digital watermarks, identifiers or indications of a channel or station that a media device was tuned to and/or a timestamp.

In some implementations, the computing device can identify the content using ACR to identify acoustic fingerprints or digital watermarks in an audio or audiovisual file, as described above.

In further implementations, the computing device can compare the acoustic fingerprints or digital watermarks to an audio database and/or a digital watermark database maintained by or in communication with the computing device. Accordingly, the computing device can match at least one of the acoustic fingerprints or the digital watermarks to content.

In other implementations, the computing device can compare the indications of a channel or station that a media device was tuned to and a timestamp to a schedule of programming. For example, if the media device was tuned to a specific television channel at a specific time (based on a channel indicator/identifier and the timestamp), the computing device can use a schedule of television programming to determine which content was being presented (e.g., identify the TV show that was broadcast) at that time on that television channel.

In 440, the computing device can match content identified in 430 to users determined in 410 and not filtered in 420. As referred to herein, content matched to users can be referred to as "content viewership data." For example, the computing device can match content to users using timestamps. In other words, a timestamp(s) indicating a user device associated with the user was within a signal range of the monitoring device at the same time as, or during the time period in which, content was being presented by a media device indicates that the user was likely viewing the content being presented. As an additional example, content data can be associated with the user device data by the monitoring device that sent the data to the computing device. Accordingly, the computing device can match the user associated with the user device data to the content associated with the corresponding content data.

In 450, the computing device can determine adjusted content viewership data, as discussed in further detail below. For example, the computing device can remove biases from the content viewership data, such as too many users of a certain gender in the data, too many users of a certain age range in the data, etc., as described with regard to FIG. 7 below.

In 460, the computing device can generate a report of content viewership. In some embodiments, the report can be generated based on the viewership data determined in 440, and can indicate overall viewership of content, channels, stations, etc. based on the participants in the content viewership monitoring. In some implementations, the viewership data in the report can be balanced using the adjusted content viewership data determined in 450.

In 470, the computing device can adjust advertising rates associated with content based on the report data. For example, if certain content is not obtaining a desired viewership of a certain demographic, an advertising rate associated with the content can be lowered. As an additional example, if certain content is obtaining viewership numbers that are higher than predicted viewership numbers, an advertising rate associated with the content can be raised.

Additionally, in some embodiments, content viewership monitoring can be performed in real time (i.e., receiving real time user device and content data from monitoring devices). Accordingly, in such embodiments, the computing device can facilitate addressable linear advertisement insertion of advertisements within linear broadcasting channels by sending the report data to addressable linear advertising insertion service providers. Addressable linear advertisement insertion allows targeted advertisements to be overlaid on top of (or potentially in place of) the linear broadcast stream. Accordingly, advertisements presented to specific households, television sets, radios, etc. can be customized based on, for example, geographic information, household demographic information, etc. Additionally, the computing device can provide real-time content viewership report data that indicates which consumers are watching television, listening to radio, etc. at a given time. Therefore, addressable linear advertisement insertion service providers can receive the real-time content viewership data from the computing device, and adjust advertisements not only based on household information, but also based on which user is actively viewing content at that moment.

While the operations depicted in FIG. 4 are shown as being performed in a particular order, the order described is merely an example, and various different sequences of operations can be performed, consistent with certain disclosed embodiments. For example, 400 can be performed repeatedly until enough data is received to proceed to 410. Additionally, as an example, 400 through 440 can be repeatedly performed each time new monitoring data is received in 400, and then the computing device can proceed to 450 once enough data is received to determine adjusted content viewership data.

Moreover, the operations are described in FIG. 4 as discrete steps merely for the purpose of explanation, and, in some embodiments, multiple operations may be performed simultaneously and/or as part of a single computation. The operations described are not intended to be exhaustive or absolute, and various operations can be inserted or removed.

Figure 5:
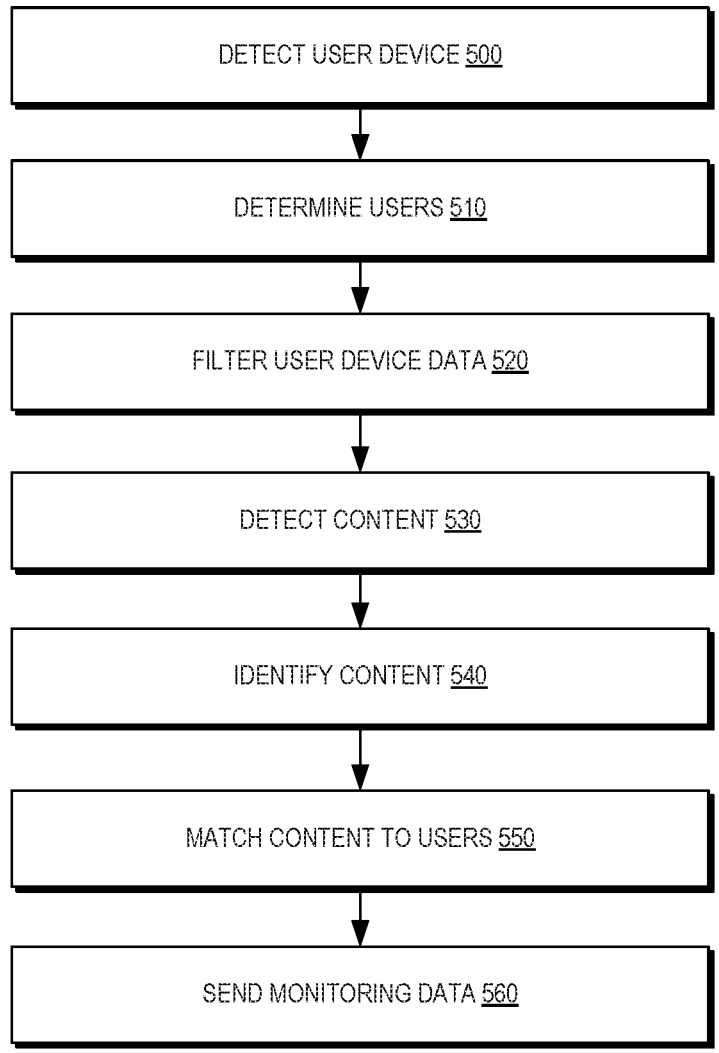
FIG. 5 is a flow diagram illustrating an example of a process of monitoring user devices and content and analyzing monitoring data, consistent with certain disclosed embodiments.

FIG. 5 is a flow diagram illustrating an example of a process of monitoring user devices and content and analyzing monitoring data, consistent with certain disclosed embodiments. In various embodiments, the process can be performed using a computerized monitoring device or devices. For example, the process can be performed by monitoring device 150 in FIG. 1 or monitoring device 210, monitoring device 220, or monitoring device 230 in FIG. 2.

The example of a process can begin in 500, when the monitoring device detects one or more user devices. For example, the monitoring device can detect the one or more user devices as described above in 300 of FIG. 3. The data detected, generated, recorded, determined, etc. in 500 can be referred to as "user device data." In 500, the monitoring device can store the user device data.

In 510, the monitoring device can identify or determine users based on the user device data. For example, the monitoring device can identify or determine users as described above in 410 of FIG. 4. However, in some embodiments, unlike in 410 of FIG. 4, in 510, determining content consumers can be performed by a monitoring device, not a central server. According, like the central server in FIG. 4, the monitoring device can have access to a roster of participating users and can compare the user device data detected in 500 to the roster of participating users to determine the user associated with the user device data. In some embodiments, the determined user can be added to the user device data.

In 520, the monitoring device can filter user device data based on a user not being identified, timestamps, signal strength, etc. For example, the monitoring device can filter user device data as described above in 420 of FIG. 4. However, in some embodiments, unlike in 420 of FIG. 4, in 520, filtering user device data can be performed by a monitoring device, not a central server. Accordingly, in some implementations, if the monitoring device filters all of a current set of user device data (e.g., the monitoring device is unable to identify any users using the user device data), the process can end and the monitoring device can return to 500 and detect one or more user devices (not shown in FIG. 5). In some embodiments, user device data that is filtered can be removed from the user device data.

In 530, the monitoring device can detect content information via a microphone, a camera, and/or a network connection with a media device. For example, the monitoring device can record audio or audiovisual files and use ACR to identify acoustic fingerprints and/or digital watermarks, as described above in 310 of FIG. 3. As used herein, the data detected, generated, recorded, determined, etc. in 530 can be referred to as "content data." In 530, the monitoring device can store the content data.

In 540, the monitoring device can identify content based on the content data, as described above in 430 of FIG. 4. However, in some embodiments, unlike in 430 of FIG. 4, in 540, identifying content can be performed by a monitoring device, not a central server. Accordingly, in various embodiments, the monitoring device can have access to an audio database and/or a digital watermark database. In some embodiments, the content identifiers can be added to the content data.

In 550, the monitoring device can match content identified in 540 to users determined in 510, as described above in 440 of FIG. 4. However, in some embodiments, unlike in 440 of FIG. 4, in 550, matching content to users can be performed by a monitoring device, not a central server. As referred to herein, content matched to content consumers can be referred to as "content viewership data."

In 560, the monitoring device can send monitoring data to a central server (e.g., server 240 in FIG. 2). In various embodiments, the monitoring data can include the user device data from 520, the content identifiers from 540, and the content viewership data from 550. In further embodiments, the monitoring data can additionally include a unique identifier of the monitoring device.

In various embodiments, the central server can use the monitoring data to, for example, generate a report of content viewership, adjust advertising rates, monitor content viewership in real time, facilitate addressable linear advertisement insertion using real-time content viewership data, etc.

While the operations depicted in FIG. 5 are shown as being performed in a particular order, the order described is merely an example, and various different sequences of operations can be performed, consistent with certain disclosed embodiments. For example, 500 can be performed repeatedly until a user device is identified and then the process can proceed to 510. Additionally, as an example, 530 can be performed repeatedly until recognizable content is identified and then the process can proceed to 540. Further, as an example, 500 and 530 can be performed repeatedly, and user device data and content data can be repeatedly stored, and then the monitoring device can determine the content viewership data in batches, for example, at predetermined intervals (e.g., once a day, once per hour, once per newly identified content, etc.).

Moreover, the operations are described in FIG. 5 as discrete steps merely for the purpose of explanation, and, in some embodiments, multiple operations may be performed simultaneously and/or as part of a single computation. The operations described are not intended to be exhaustive or absolute, and various operations can be inserted or removed.

Figure 6:
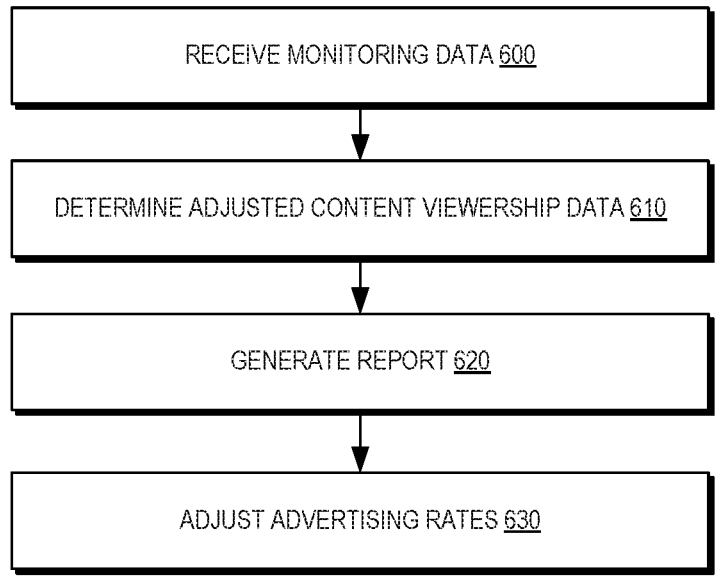
FIG. 6 is a flow diagram illustrating an example of a process of analyzing monitoring data that includes content viewership data from monitoring devices, consistent with certain disclosed embodiments.

FIG. 6 is a flow diagram illustrating an example of a process of analyzing monitoring data that includes content viewership data from monitoring devices, consistent with certain disclosed embodiments. In various embodiments, the process can be performed using a computing device (or multiple computing devices). For example, the process can be performed by server 240 in FIG. 2 after receiving monitoring data from one or more monitoring devices (e.g., 320 in FIG. 3).

The example process can begin in 600 when the computing device receives the monitoring data from one or more monitoring devices. In various embodiments, the monitoring data can include user device data, content data, and content viewership data. In further embodiments, the monitoring data can include a unique identifier of the monitoring device that generated the monitoring data.

In 610, the computing device can determine adjusted content viewership data based on the content viewership data, as discussed in further detail below.

In 620, the computing device can generate a report of content viewership based on the content viewership data received in 600, as described above in 460 of FIG. 4.

In 630, the computing device can adjust advertising rates associated with content based on the report data or facilitate addressable linear advertisement insertion using real-time content viewership data, as described above in 470 of FIG. 4.

While the operations depicted in FIG. 6 are shown as being performed in a particular order, the order described is merely an example, and various different sequences of operations can be performed, consistent with certain disclosed embodiments. For example, 600 can be performed repeatedly until enough data is received to proceed to 610.

Moreover, the operations are described in FIG. 6 as discrete steps merely for the purpose of explanation, and, in some embodiments, multiple operations may be performed simultaneously and/or as part of a single computation. The operations described are not intended to be exhaustive or absolute, and various operations can be inserted or removed.

Figure 7:
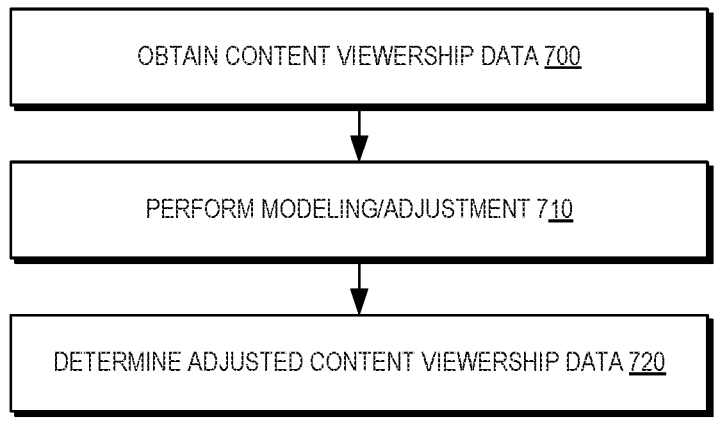
FIG. 7 is a flow diagram illustrating an example of a process of determining adjusted content viewership data, consistent with certain disclosed embodiments.

FIG. 7 is a flow diagram illustrating an example of a process of determining adjusted content viewership data, consistent with certain disclosed embodiments. In various embodiments, the process can be performed using a computing device (or multiple computing devices). For example, the process can be the process performed by server 240 in 450 in FIG. 4 and/or the process performed by server 240 in 610 in FIG. 6, described above.

In 700, the computing device can obtain content viewership data. For example, the computing device can obtain the content viewership data by performing 400-440 in FIG. 4, as described above. As an additional example, the computing device can receive the content viewership data from one or more monitoring devices, as described in 600 in FIG. 6.

In 710, the computing device can perform a modeling and/or an adjustment technique on the content viewership data.

In some embodiments, the computing device can calculate an error rate and apply the error rate to the content viewership data. For example, the computing device can perform one or more methods and/or use one or more systems described in U.S. Pat. No. 7,376,722 that issued 20 May 2008, which is hereby incorporated by reference in its entirety.

In other embodiments, the computing device can determine one or more adjustment factors based on the content viewership data and apply the one or more adjustment factors to the content viewership data. For example, the computing device can perform one or more methods and/or use one or more systems described in U.S. Pat. No. 8,626,901 that issued 7 Jan. 2014, which is hereby incorporated by reference in its entirety.

In further embodiments, the computing device can determine a demographic distribution of users associated with the content viewership data based on assigned demographic values for a plurality of users that have accessed a particular entity. For example, the computing device can perform one or more methods and/or use one or more systems described in U.S. patent application Ser. No. 14/173,414 filed 5 Feb. 2014, which is hereby incorporated by reference in its entirety.

In other implementations, the computing device can use other known modeling and/or adjustment techniques to, for example, remove biases from the content viewership data, such as too many users of a certain gender in the data, too many users of a certain age range in the data, etc.

In 720, the computing device can determine adjusted content viewership data. For example, the computing device can determine the adjusted content viewership data based on an error rate applied to the content viewership data, based on one or more adjustment factors applied to the content viewership data, and/or based on based on assigned demographic values.

In various embodiments the adjusted content viewership data can be used in generating a report on content viewership (e.g., as described with regard to 460 in FIG. 4).

While the operations depicted in FIG. 7 are shown as being performed in a particular order, the order described is merely an example, and various different sequences of operations can be performed, consistent with certain disclosed embodiments.

Moreover, the operations are described in FIG. 7 as discrete steps merely for the purpose of explanation, and, in some embodiments, multiple operations may be performed simultaneously and/or as part of a single computation. For example, in some embodiments, 710 and 720 can be performed as part of a single computation. The operations described are not intended to be exhaustive or absolute, and various operations can be inserted or removed.

Figure 8:
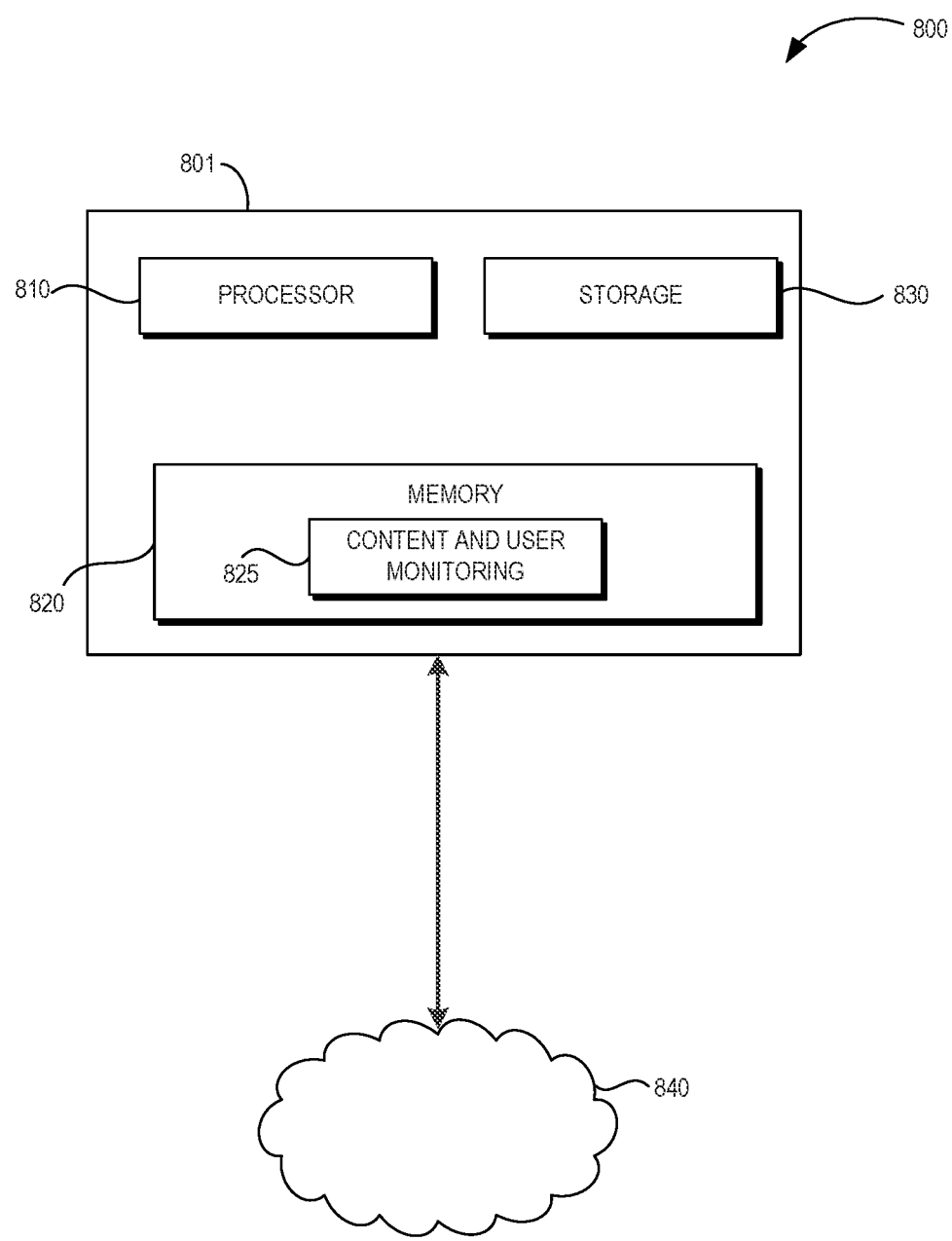
FIG. 8 is a diagram illustrating an example of a hardware system that may be used to implement a content and user monitoring system, consistent with certain disclosed embodiments.

FIG. 8 is a diagram illustrating an example of a hardware system for providing a content and user monitoring system, consistent with certain disclosed embodiments. An example hardware system 800 includes example system components that may be used. The components and arrangement, however, may be varied.

Computer 801 may include processor 810, memory 820, storage 830, and input/output (I/O) devices (not pictured). The computer 801 may be implemented in various ways and can be configured to perform any of the embodiments described above. In some embodiments, computer 801 can be a general purpose computer of an end user such as, for example, a desktop computer, a laptop, a tablet device, a mobile device (e.g., a smartphone), etc. In other embodiments, computer 801 can be a computing device such as, for example, a database server, a web server, a mainframe computer, etc. For example, computer 801 can be monitoring device 150 in FIG. 1 or monitoring device 210, monitoring device 220, monitoring device 230, or server 240 in FIG. 2. Computer 801 may be standalone or may be part of a subsystem, which may, in turn, be part of a larger system.

The processor 810 may include one or more known processing devices, such as a microprocessor from the Intel Core™ family manufactured by Intel™, the Phenom™ family manufactured by AMD™, or the like. Memory 820 may include one or more storage devices configured to store information and/or instructions used by processor 810 to perform certain functions and operations related to the disclosed embodiments. Storage 830 may include a volatile or non-volatile, magnetic, semiconductor, tape, optical, removable, non-removable, or other type of computer-readable medium used as a storage device. In some embodiments, storage 830 can include, for example, one or more of a roster of users, an audio database, a digital watermark database, signal level thresholds, etc.

In an embodiment, memory 820 may include one or more programs or subprograms including instructions that may be loaded from storage 830 or elsewhere that, when executed by computer 801, and more specifically by processor 810, perform various procedures, operations, or processes consistent with disclosed embodiments. For example, memory 820 may include content and user monitoring program 825 for detecting user devices, detecting content, matching users to content, generating reports of content viewership, adjusting advertising rates, etc., according to various disclosed embodiments. Memory 820 may also include other programs that perform other functions, operations, and processes, such as programs that provide communication support, Internet access, etc. The content and user monitoring program 825 may be embodied as a single program, or alternatively, may include multiple sub-programs that, when executed, operate together to perform the function of the content and user monitoring program 825 according to disclosed embodiments. In some embodiments, content and user monitoring program 825 can perform all or part of the processes of FIGS. 3, 4, 5, 6, and/or 7 described above.

Computer 801 may communicate over a link with network 840. For example, the link may be a direct communication link, a local area network (LAN), a wide area network (WAN), or other suitable connection. Network 840 may include the internet, as well as other networks, which may be connected to various systems and devices.

Computer 801 may include one or more input/output (I/O) devices (not pictured) that allow data to be received and/or transmitted by computer 801. I/O devices may also include one or more digital and/or analog communication I/O devices that allow computer 801 to communicate with other machines and devices. I/O devices may also include input devices such as a keyboard or a mouse, and may include output devices such as a display or a printer. Computer 801 may receive data from external machines and devices and output data to external machines and devices via I/O devices. The configuration and number of input and/or output devices incorporated in I/O devices may vary as appropriate for various embodiments.

Example uses of the system 800 can be described by way of example with reference to the embodiments described above.

While the teachings has been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method for identifying content displayed by a media device and associating the content with demographics of one or more users associated with the media device, the method comprising:

receiving, at a monitoring device that is in electrical communication with the media device, a short-range wireless signal from a user device, the user device being different from the monitoring device;

capturing, by the monitoring device and in response to reception of the short-range wireless signal from the user device, an image of the content displayed by the media device;

detecting a volume of the content displayed by the media device;

identifying, at the monitoring device, one or more image fingerprints in the image of the content;

transmitting, from the monitoring device to a server that is remote from the monitoring device, the one or more image fingerprints, the volume of the content, a timestamp of the time at which the image was captured, and an identifier associated with the user device;

comparing, at the server, the one or more image fingerprints to fingerprints in a database to identify the content displayed by the media device;

associating, at the server and using the identifier associated with the user device, the identity of the content with demographic information of a user associated with the user device; and generating, at the server, a report of the content viewership of the content displayed by the media device.

2. The method of claim 1, further comprising capturing subsequent images of the content displayed by the media device at a predetermined time interval.

3. The method of claim 1, wherein the image of the content is captured at the monitoring device using the connection or a video camera of the monitoring device.

4. The method of claim 1, wherein the identifier associated with the user device is a unique identifier of the user device or a name of the user associated with the user device.

5. The method of claim 1, wherein associating the identity of the content with the demographic information of the user associated with the user device comprises retrieving the demographic information of the user associated with the user device from a database that stores demographic information for users that have elected to participate in content viewership monitoring.

6. The method of claim 5, wherein the demographic information for users that have elected to participate in content viewership monitoring comprises, for each user, one or more of name, date of birth, gender, nationality, race, residence address, occupation, level of education, income, type of user device, and/or identifier of user's user device.

7. The method of claim 1, wherein the user device is a smartphone, a tablet computer, a portable media player, a laptop, a laptop/tablet computer hybrid, a smartwatch, an activity tracker, or a Bluetooth tracker.

8. The method of claim 1, wherein the content displayed by the media device comprises one or more of a television show, a movie, a sporting event, a video commercial or advertisement, and a still-picture advertisement.

9. The method of claim 1, wherein identifying the one or more image fingerprints in the image of the content comprises using automatic content recognition (ACR) to identify the one or more image fingerprints in the image of the content.

10. The method of claim 1, wherein the monitoring device is in electrical communication with the media device via a local area network (LAN) wired or wireless connection.

11. The method of claim 1, wherein the monitoring device and the media device are incorporated into one device.

12. The method of claim 1, further comprising adjusting, at the server, an advertising rate based on the report of the content viewership of the content displayed by the media device.

13. The method of claim 1, further comprising selecting, at the server, advertisements targeted for specific demographics based on the report of the content viewership of the content displayed by the media device.

14. The method of claim 1, wherein detecting the volume of the content displayed by the media device comprises determining a decibel level of the volume and/or classifying the volume as high or low based on the decibel level.

15. A system for identifying content displayed by a media device and associating the content with demographics of one or more users associated with the media device, the system comprising:
- a media device configured to display content;
- a user device associated with a user;
- a monitoring device in electrical communication with the media device and for collecting information used to recognize the content displayed by the media device, the monitoring device being configured to:
  - receive a short-range wireless signal from the user device;
  - capture, in response to reception of the short-range wireless signal from the user device, an image of the content displayed by the media device;
  - detect a volume of the content displayed by the media device;
  - identify one or more image fingerprints in the image of the content; and
  - transmit the one or more image fingerprints, the volume of the content, a timestamp of the time at which the image was captured, and an identifier associated with the user device; and
- a server that is remote from the monitoring device, the server being configured to:
  - receive the one or more image fingerprints, the volume of the content, the timestamp of the time at which the image was captured, and the identifier associated with the user device;
  - compare the one or more image fingerprints to fingerprints in a database to identify the content displayed by the media device;
  - associate, using the identifier associated with the user device, the identity of the content with demographic information of the user associated with the user device; and
  - generate a report of the content viewership of the content displayed by the media device.

16. The system of claim 15, wherein the monitoring device is further configured to capture subsequent images of the content displayed by the media device at a predetermined time interval.

17. The system of claim 15, wherein the monitoring device is configured to capture the image of the content using the connection or a video camera of the monitoring device.

18. The system of claim 15, wherein the server is configured to associate the identity of the content with the demographic information of the user associated with the user device by retrieving the demographic information of the user associated with the user device from a database that stores demographic information for users that have elected to participate in content viewership monitoring.

19. The system of claim 15, wherein the monitoring device and the media device are incorporated into one device.

20. The system of claim 15, wherein monitoring device is configured to detect the volume of the content displayed by the media device by determining a decibel level of the volume and/or classifying the volume as high or low based on the decibel level.

* * * * *